May 9, 1933.  R. H. MADDOCK  1,908,638
CROSS MEMBER FOR VEHICLE FRAMES
Filed Dec. 31, 1930  2 Sheets-Sheet 1
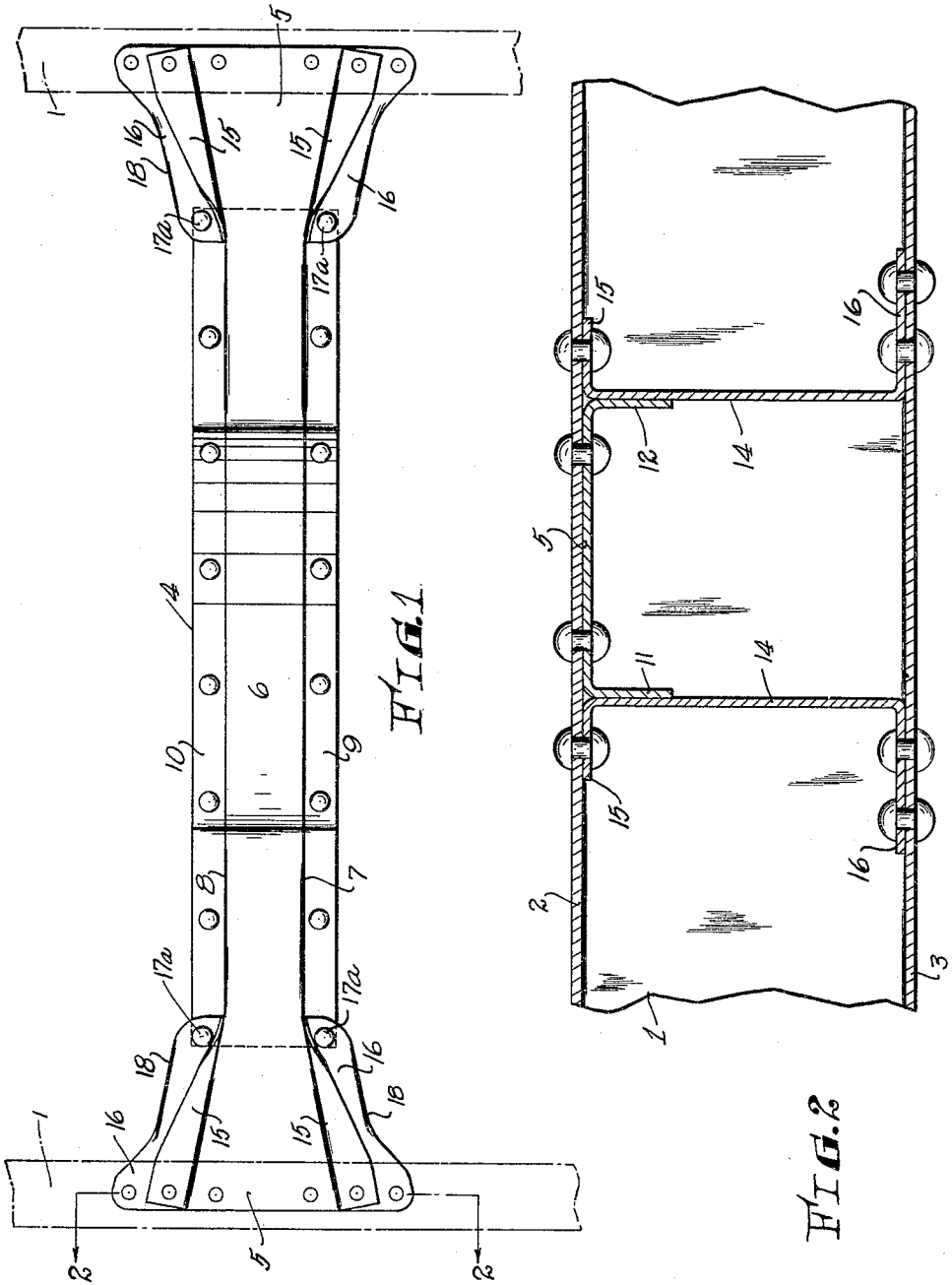
Inventor
Robert H. Maddock
By Justin W. Macklin
Attorney May 9, 1933.  R. H. MADDOCK  1,908,638
CROSS MEMBER FOR VEHICLE FRAMES
Filed Dec. 31, 1930   2 Sheets-Sheet 2
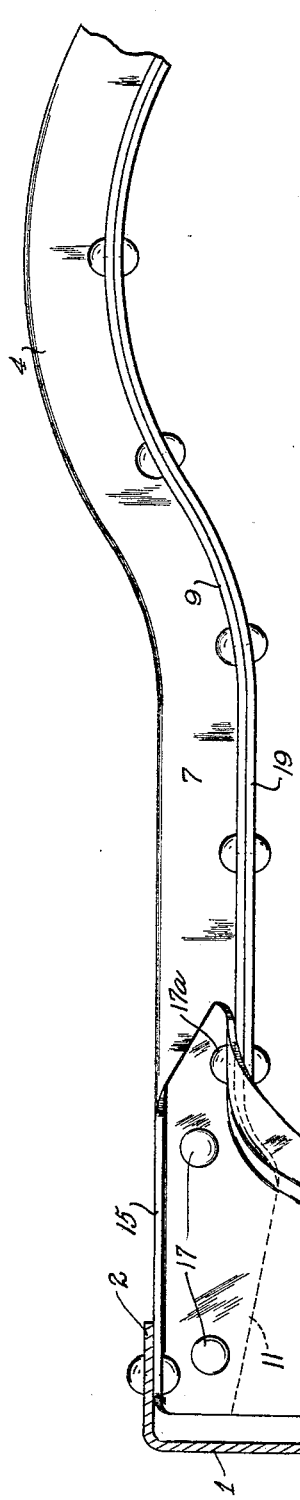
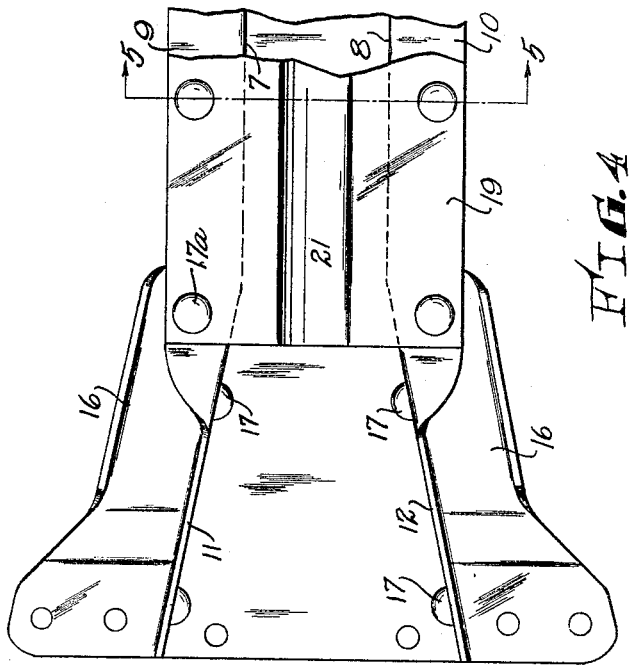
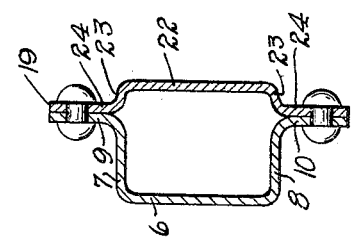
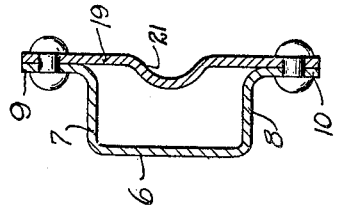
Inventor
Robert H. Maddock
By Justin W. Macklin
Attorney Patented May 9, 1933

1,908,638

UNITED STATES PATENT OFFICE

ROBERT H. MADDOCK, OF CLEVELAND, OHIO, ASSIGNOR TO THE MIDLAND STEEL PRODUCTS COMPANY, OF CLEVELAND, OHIO, A CORPORATION OF OHIO

CROSS MEMBER FOR VEHICLE FRAMES

Application filed December 31, 1930. Serial No. 505,841.

My invention relates to cross bar members for automobile frames and the like and more particularly to an improved cross bar which imparts to the frame a degree of stability and rigidity commensurate with the strength of the particular frame of which it forms a part.

The cross bar with which my invention is particularly concerned provides a wide distribution of the points of connection with the side rail members of the frame which reduces the stresses to a noticeable degree.

Further, my invention includes a cross bar member in which each part is commensurate in strength with the particular stress or stresses to which subjected in use, and no part is of excessive strength or weight, whereby even distribution of stresses is obtained and the concentration of stresses is eliminated, which results in effecting economies in producing such cross members.

Another object of my invention is to correlate the strength of the various parts of the cross bar member and the vehicle frame with which associated to the working stresses to which subjected, so as to provide a member, each part of which will withstand the operating stresses and will fail only upon substantially concurrent failure of each other part and of the side rails whereby the stock material is most effectively utilized.

My invention consists of a cross bar member, the main body of which is formed from a rectangular strip of sheet metal, the entire strip being utilized in the cross bar and the waste arising from contouring the blank for the bar is eliminated.

Another object of my invention is a cross member which is substantially box like in form and which will withstand more severe bending and torsional stresses in proportion to the thickness of the stock used than will cross members heretofore produced, and which may be easily and securely attached to the side rails of the vehicle frame so as to evenly distribute the stresses imparted to the side rails and the cross member.

Another object of my invention is a cross bar capable of withstanding very great torsional stresses.

Other objects and advantages will become apparent from the following specification in which reference is made to the drawings by the use of numerals.

In the drawings, Fig. 1 is a plan view of a cross member embodying the principles of my invention, the channel members of the vehicle frame being indicated by dot and dash lines.

Fig. 2 is a cross sectional view of the cross bar member taken on a plane indicated by the line 2—2 of Fig. 1.

Fig. 3 is an enlarged side elevation of part of a cross bar member illustrated in Fig. 1.

Fig. 4 is a bottom plan view of an end of the cross bar member illustrated in Fig. 3.

Fig. 5 is a cross sectional view taken on a plane indicated by the line 5—5 of Fig. 4.

Fig. 6 is a cross sectional view similar to the view in Fig. 5 illustrating a slightly modified form of my invention.

Referring to Figs. 1 to 6 inclusive of the accompanying drawings, the cross bar member is attached to an automobile or other vehicle frame, the side rail members of which are indicated by the dot-dash line, designated 1. These channel members consist of vertically extending webs with inwardly extending flanges 2 and 3.

The cross bar member may be formed from a rectangular strip, the strip being formed into a channel-like body portion 4, comprising a bridge or web 6 and parallel depending side walls 7 and 8 terminating at their lower ends in flanges 9 and 10, which may be substantially parallel to the plane of the web 6. The ends of the bridge 6 may be wider than the intermediate portion and flared outwardly forming gussetlike ends 5, the depending walls 11 and 12 of which are of less depth than the walls of the intermediate body portion, part of the material being utilized in extra width.

The downwardly extending walls 11 and 12 of the ends 5 may be substantially the same depth at the outer ends as the walls 7 and 8 of the body 4, depending on the width of the flared end, and taper downwardly inwardly of the cross bar member. On each of the flared ends 5 is a pair of gusset members which are roughly of channel shaped cross section with the base or web 14 of the gussets lying normal to the main body of the cross member and the flanges extending outwardly therefrom substantially parallel to the surface of the cross member. The webs 14 of the gussets are secured to the downwardly extending walls 11 and 12 of the ends 5 by means of rivets 17 or other suitable means, as better illustrated in Fig. 3. The inner ends of the lower flanges 16 of the gussets may overlap the lower flanges 9 and 10 of the cross member and likewise may be secured thereto by rivets as indicated at 17A.

To insure greater rigidity the outer extremities of the flanges 16 are turned back preferably parallel to the web of the gussets to form flanges 18. The flanges 18 render the gussets more resistant to torque stresses and prevent twisting of the flanges 16, or buckling of the flanges normal to their width. The upper flanges 15 of the gusset members lie in the plane of the bridge 6 of the cross member and each is provided with openings adapted to receive a rivet for connecting it to the side members of the vehicle frame. Instead of turning the flanges 18 on the flanges 16, the flanges 16 may be rendered rigid by forming a rib or the like on the flanges 16. This provides widely separated points of connection between the cross member and the vehicle frame. The outer extremities of the flanges 16 of the gussets lie in the plane of the bottom flange 3 of the side rail members and likewise provide widely separated points of connection therewith. The entire cross member is secured to the side rails by rivets or other suitable means, the outer ends of the cross member extending preferably close to or even against the web of the side rails.

As above stated, to insure a greater degree of rigidity and to provide a cross member capable of withstanding greater torque I secure to the cross member a closure plate 19 which extends substantially the full length of the narrow portion of the cross bar member, and for greatest effectiveness should extend beyond the inner edge of the flanges 16 of the gussets. This closure plate is secured to the flanges 9 and 10 of the cross member by rivets or other suitable means. As illustrated in Figs. 4 and 5, this closure plate 19 may be corrugated or have a central rib, as indicated at 21, to insure greater strength and rigidity and also to assist in the die forming of the cross member. The entire cross member may be arched in the center as indicated in Fig. 3 to impart greater strength and for other well known purposes.

Another form of closure plate as illustrated in Fig. 6, includes a channel-like section having a web 22 and short depending walls 23 and outwardly extending flanges 24 complementary to those of the cross member.

Referring particularly to Figs. 5 and 6, I have found that the form of reinforcing member there illustrated may be made with very slightly more material than that illustrated in Fig. 5. This results largely from the fact that in making the abrupt bends between the walls 23 and web or base 22, there is considerable drawing and lengthening of the stock material. This latter construction provides greater depth and a cross section having a greater polar moment of inertia and consequently the member will withstand greater torque. By using this form I obtain a member of substantially as great strength with the use of slightly smaller gauge material, thus effecting a further saving.

Experience has proven that in general the tendency of cross members is to fail by shearing the rivets connecting it with the side frame or by buckling of the widened ends near to the side frame or by breaking down in torque resistance at intermediate portions of the cross bar. By making the intermediate portions of the cross bar in boxlike form, preferably as above described, this torque is better resisted. By distributing the points of connection of the side rail members over a considerable length of the side rails the shearing stress is reduced and the concentration of other stresses in the side rail members is likewise greatly reduced. The form of gussets, illustrated above, tends to reinforce the ends of the cross bar member adjacent to the frame side rails. The gussets are flanged so as to greatly strengthen the web and prevent its buckling normal to its width, and each of the side flanges in turn is provided with a flange to prevent buckling normal to the width of the flange. The box formation provides greater torque resistance.

Thus the gussets are reinforced in all directions and will withstand severe torsional and lateral stresses and bending moments.

It is apparent, therefore, that by the construction shown, I have provided a cross member which, without requiring a greater amount of material than that usually required, is much stronger than cross members heretofore made.

Having thus described my invention, I claim:

1. In a frame for automobiles or other vehicles including spaced side rail members having upper and lower inwardly disposed flanges, a cross bar member comprising a body of substantially channel shaped cross section the lower margin of the channel having flanges parallel to the web of the channel and vertically depending gussets at each end of the cross member, each gusset having an upper flange lying in the plane of the web of said cross member and a lower flange angularly disposed to the web of the gusset and overlapping a part of the last mentioned flanges of the cross member, the upper flange of each of said gussets being adapted to engage the upper flange of the side rail and the lower flange being adapted to engage the lower flange of the side rail of the vehicle, at points separated at a distance greater than the width of the body of the cross member.

2. A frame for automobiles and the like, including a pair of channelled side rails, each having upper and lower flanges and a cross bar member connecting said side rails, said cross bar member being channel shaped in cross section and having a web and downwardly depending flanges, gussets at each end of said member secured to each of said flanges, each of said gussets having an upper flange lying in the plane of the web of said cross member and a lower flange, said lower flange having an intermediate portion lying in a plane convergent inwardly of the cross member toward the plane of the upper flange, the intermediate flange having its outer margin turned to form a flange extending inwardly of the cross member to stiffen the same.

3. In a frame for automobiles and the like, including a pair of channel side rails, each having upper and lower flanges, a cross bar member connecting said side rails, said cross bar member comprising a web and side walls depending therefrom, the lower portion of said walls being turned into flanges terminating near the ends of said cross bar member, gussets secured to the side walls at each end of said cross bar member and extending from the end of said member inwardly and overlapping the ends of said flanges, each of said gussets having an upper flange adapted to engage the upper flange of the side rail and a lower flange engaging the lower flange of the side rail.

4. In a frame for automobiles and the like, including a pair of channel side rails, each having upper and lower flanges, a cross bar member connecting said side rails, said cross bar member comprising a web and side walls depending therefrom, the lower portion of said walls being turned into flanges terminating near the ends of said cross bar member, gussets secured to the side walls at each end of said cross bar member and extending from the end of said member inwardly and overlapping the end of said flanges, each of said gussets having an upper flange adapted to engage the upper flange of the side rail and a lower flange engaging the lower flange of the side rail, and a bottom plate secured to the flanges of said cross member and extending along the cross member and terminating outside of the inner limits of said gussets.

5. In a vehicle frame including spaced longitudinal channel side rails having inwardly disposed upper and lower flanges, a cross bar member having channel shaped end portions, and substantially vertically disposed gussets on each flange of the channel portions, said gussets being flanged outwardly from the cross member at the upper and lower portions for engagement with the upper and lower side rail flanges of the side rail members of the vehicle frame respectively, said gussets each being secured to both side rail flanges and the points of engagement of the upper flanges of the gussets with the upper flanges of the respective side rails being separated a distance greater than the cross sectional width of the cross member.

6. A vehicle frame including spaced longitudinal channel side rails, said side rails having inwardly disposed upper and lower flanges, a cross bar member having channel shaped end portions and an intermediate hollow closed portion, and substantially vertically disposed gussets on each flange of the channel portions, said gussets being flanged outwardly from the cross member at the upper and lower portion for engagement with the upper and lower side rail flanges of the side rail members of the vehicle frame respectively and extending inwardly of the cross bar member past the end of the hollow closed portion, and the lower flange of said gussets having a portion bent from the plane of the flange to stiffen the same.

7. In a frame for automobiles and the like, including a pair of channelled side rails, each having upper and lower flanges and a cross bar member connecting said side rails, said cross bar member being channel shaped in cross section and having a web and downwardly depending flanges, gussets at each end of said member secured to each of said flanges, each of said gussets having an upper flange lying in the plane of the web of said cross member for engaging the upper flange of the side rail and a lower flange for engaging the lower flanges of said side rail, said lower flange being parallel at its outer end to the upper flange and having an intermediate portion lying in a plane convergent inwardly of the cross member toward the plane of the upper flange, the intermediate flange having its outer margin turned to form a stiffening flange.

8. In a frame for automobiles and the like, including a pair of channel side rails, each having upper and lower flanges, a cross bar member connecting said side rails, said cross bar member comprising a web and side walls depending therefrom, a closure plate secured thereto and terminating near the ends of said cross bar member, and having a longitudinally extending stiffening element formed therein, gussets secured to the side walls at each end of the cross bar member thereof, and extending from the end of said member inwardly past the end of said closure plate, each of said gussets being secured to both flanges of the side rails of said frame.

9. In a frame for motor vehicles, including spaced longitudinal side rail members having inwardly disposed upper and lower flanges, a cross member of box cross section secured at its ends to said side rail members, vertically disposed gussets on each side of the end portions of said cross member, each of said gussets having upper and lower flanges extending outwardly from the sides of the cross member, said flanges being adapted for engagement with the upper and lower flanges respectively of the side rails, and smaller flanges on flanges of the gussets angularly disposed to the surface of the flanges with which associated for stiffening said flanges against buckling.

10. The combination with an automobile frame including side rails having upper and lower flanges, a torsion and shear resisting cross bar comprising a channel member secured to the upper flanges of the side rails and a gusset plate extending in a plane parallel to a flange of the cross bar between the cross bar and flanges of the side rail and secured thereto and to the cross bar, said gusset having upper and lower lateral flanges, and the free margin of one of said flanges of the gusset being bent to be disposed in a vertical plane.

11. The combination with an automobile frame including side rails having upper and lower flanges, a torsion and shear resisting cross bar comprising a channel member having its top secured to the upper flanges of the side rails, and separate gusset plates secured to the sides of the bar and to the upper and lower flanges of the side rails.

12. The combination with an automobile frame including side rails having upper and lower flanges, a torsion and shear resisting cross bar comprising a channel member having its web secured to the upper flanges of the side rails, and gusset plates at the ends of the cross bar secured to the upper and lower flanges of the side rails and provided with reinforcing means extending between the cross bar and lower flanges of the side rails.

13. A cross member of closed box section having substantially channel shape end portions formed by spaced imperforate vertical gusset portions extending from the sides of said member at each end and in substantially the same vertical plane therewith, and the space between the lower ends of the gusset portions being open to render the interior of the end portions accessible.

14. A cross bar member of closed box section including a web, the margins of said web at opposite ends of the member diverging outwardly, spaced imperforate vertical gusset portions extending from said diverging margins of the web, and the space between the lower ends of the gusset portions being open to render the interior of the end portions accessible.

15. A cross bar member of substantially channel shaped cross section including web and side flanges vertical gussets secured to said flanges at their ends, and said gusset portions having laterally extending upper and lower flanges at its ends extending outwardly from opposite sides of the member at both ends thereof.

16. A cross bar member comprising a body of substantially channel shaped cross section including web and side flanges, the lower edges of said side flanges terminating in flanges parallel to said web and terminating short of the ends of the cross member, gusset plates secured to the side flanges and having flanges overlapping and secured to the flanges parallel to the web.

17. A cross bar member comprising a body of substantially channel shaped cross section including web and side flanges, the lower edges of said side flanges terminating in flanges parallel to said web and terminating short of the ends of the cross member, gusset plates secured to the side flanges and having flanges overlapping and secured to the flanges parallel to the web, and the flanges of said gusset plates having longitudinally extending reinforcing means.

18. A cross bar member comprising a body of substantially channel shaped cross section including web and side flanges, the lower edges of said side flanges terminating in flanges parallel to said web and terminating short of the ends of the cross member, gusset plates secured to the side flanges and having flanges overlapping and secured to the flanges parallel to the web, and the flanges of said gusset plates having longitudinal subflanges substantially parallel to the gusset plates.

19. A cross bar member comprising a body including web and side flanges, and gusset plates secured to said side flanges and having upper flanges in the plane of the web, and lower flanges substantially parallel to the upper flanges and arranged in a plane below the upper edges of said side flanges of the cross member.

20. The combination with an automobile frame including side rails having upper and lower flanges, a torsion and shear resisting cross bar comprising a channel member having its top secured directly to the upper flanges of the side rail, and a reinforcing gusset having a vertical web secured to the sides of the cross bar and parallel to the flanges of the channel member, and said gusset having horizontal lateral flanges secured to the upper and lower flanges of a side rail.

In testimony whereof, I hereunto affix my signature.

ROBERT H. MADDOCK.